United States Patent
Kamiura et al.

(10) Patent No.: US 8,560,789 B2
(45) Date of Patent: Oct. 15, 2013

(54) DISK APPARATUS, DATA REPLICATING METHOD ONTO DISK APPARATUS AND PROGRAM RECORDING MEDIUM

(75) Inventors: Tomoka Kamiura, Tokyo (JP); Kazuyuki Nagumo, Tokyo (JP)

(73) Assignee: NEC Corporation, Tokyo (JP)

( * ) Notice: Subject to any disclaimer, the term of this patent is extended or adjusted under 35 U.S.C. 154(b) by 228 days.

(21) Appl. No.: 13/223,801

(22) Filed: Sep. 1, 2011

(65) Prior Publication Data

US 2012/0059986 A1    Mar. 8, 2012

(30) Foreign Application Priority Data

Sep. 7, 2010   (JP) .................................. 2010-199439

(51) Int. Cl.
*G06F 12/16*    (2006.01)

(52) U.S. Cl.
USPC .......................................... 711/162; 711/161

(58) Field of Classification Search
None
See application file for complete search history.

(56) References Cited

U.S. PATENT DOCUMENTS

| | | | |
|---|---|---|---|
| 2010/0023717 A1* | 1/2010 | Jinno et al. | 711/162 |
| 2010/0250496 A1* | 9/2010 | Nakamura et al. | 707/649 |
| 2010/0281229 A1* | 11/2010 | Iwamura et al. | 711/162 |
| 2011/0258408 A1* | 10/2011 | Akutsu et al. | 711/162 |

FOREIGN PATENT DOCUMENTS

| | | |
|---|---|---|
| JP | 2004192133 A | 7/2004 |
| JP | 2005292865 A | 10/2005 |
| JP | 2008004090 A | 1/2008 |
| JP | 2010002176 A | 4/2010 |

* cited by examiner

*Primary Examiner* — Than Nguyen

(57) ABSTRACT

A disk apparatus includes a second volume to which data of a first volume is copied, a third volume which stores a snapshot of the first volume, and an I/O processing unit which reads out data from the third volume when data of an area in which difference data exists in the third volume is read out, when data of an address in which the difference data does not exist in the third volume is read out, reads out data from the first volume if data copying from the first volume to the second volume has not been completed, and reads out data from the second volume if the data copying has been completed.

10 Claims, 15 Drawing Sheets

Fig.2

| MASTER VOLUME NUMBERS | REMOTE MASTER VOLUME NUMBERS | LATEST GENERATION SNAPSHOT VOLUME NUMBERS |
|---|---|---|
| MV0 | RMV0 | SV0 |
| MV1 | — | — |
| MV2 | RMV1 | SV17 |
| MV3 | — | — |
| ... | ... | ... |
| MVn | — | — |

Fig.3

| PAGE NUMBERS | SV0 | SV1 | ... | SV16 | ... | SVn |
|---|---|---|---|---|---|---|
| page0 | 1 | ... | ... | 0 | ... | ... |
| page1 | 1 | ... | ... | 1 | ... | ... |
| page2 | 0 | ... | ... | 1 | ... | ... |
| page3 | 0 | ... | ... | 0 | ... | ... |
| ... | ... | ... | ... | ... | ... | ... |
| pagex | 0 | ... | ... | 0 | ... | ... |

Fig.4

| PAGE NUMBERS | MV0 | MV1 | ... | MVn |
|---|---|---|---|---|
| page0 | 1 | 1 | ... | ... |
| page1 | 1 | 1 | ... | ... |
| page2 | 0 | 1 | ... | ... |
| page3 | 1 | 0 | ... | ... |
| ... | ... | ... | ... | ... |
| pagex | 0 | ... | ... | ... |

Fig.5

| PAGE NUMBERS | MV0 | MV1 | ... | MVn |
|---|---|---|---|---|
| page0 | 0 | 1 | ... | ... |
| page1 | 1 | 0 | ... | ... |
| page2 | 0 | 1 | ... | ... |
| page3 | 1 | 0 | ... | ... |
| ... | ... | ... | ... | ... |
| pagex | 0 | ... | ... | ... |

Fig.6

| PAGE NUMBERS | SV0 | SV17 | ... | SVn |
|---|---|---|---|---|
| page0 | 1 | 0 | ... | ... |
| page1 | 0 | 0 | ... | ... |
| page2 | 0 | 0 | ... | ... |
| page3 | 0 | 1 | ... | ... |
| ... | ... | ... | ... | ... |
| pagex | 0 | ... | ... | ... |

DISK APPARATUS, DATA REPLICATING METHOD ONTO DISK APPARATUS AND PROGRAM RECORDING MEDIUM

This application is based upon and claims the benefit of priority from Japanese Patent Application No. 2010-199439, filed on Sep. 7, 2010, the disclosure of which is incorporated herein in its entirety by reference.

TECHNICAL FIELD

The present invention relates to a disk apparatus, a data replicating method onto the disk apparatus and a program recording medium.

BACKGROUND ART

In a storage device such as a disk array apparatus, a method which creates complete replication of backup target volume is known as a method to create data backup of backup target volume in a remote site. This method needs a backup volume having the same capacity as the backup target volume. Accordingly, when a user wishes to create and manage multiple generations of backup volumes in a remote site, a large amount of volumes are needed and the backup cost increases.

In order to avoid such demerits of backup by the complete replication, a data backup method using a snapshot method is known (for example, patent document 1 (Japanese Patent Application Publication No. 2004-192133), patent document 3 (Japanese Patent Application Publication No. 2008-004090) and patent document 4 (Japanese Patent Application Publication No. 2010-092176)). This method can create the backup volume with small amount of necessary storage capacity compared with the method to create the complete replication.

The snapshot method mentioned here is the technology for maintaining the state of the backup target volume (the master volume) at a time of creating the snapshot. For example, supposing a snapshot of the master volume which stores data shown in FIG. 13 has been created, the snapshot volume having the same storage capacity as this master volume is created. And, for example, at the time when writing of data "EE" occurs in a storage area of data "BB" of the master volume, the data "BB" before updated is stored in the identical address of the snapshot volume (FIG. 14).

In other words, the backup target volume is instantly replicated seemingly because it is enough only defining the snapshot volume at the time of snapshot creation.

When a host reads data of the snapshot volume, the data of the snapshot volume is referred to for the address in which data exists in the snapshot volume, and the data of the master volume is referred to for the address in which data does not exist in the snapshot volume. As a result, the host can acquire the data of the master volume as of snapshot creation.

A method which creates multiple generations of snapshot volumes in a remote site using this snapshot method exists (for example, patent document 2 (Japanese Patent Application Publication No. 2005-292865)). This method can create the multiple generations of backup volumes in a remote site with suppressing the backup cost.

However, snapshot volume access by the snapshot method refers to the master volume when data does not exist in the snapshot volume. Therefore, the method described in the patent document 2 needs the replication volume for the master volume in the remote site (refer to FIG. 15). Also, it needs to synchronize the replication volume with the master volume when creating the snapshot volume because the snapshot volume access refers to the replication volume in a case where data does not exist in the snapshot volume. As mentioned above, in the above-mentioned technology, it is necessary to synchronize the replication volume with the master volume at the time of snapshot creation.

SUMMARY

Accordingly, in order to solve such problem, the present invention provides a disk apparatus, a data replicating method onto the disk apparatus and a program, which can create multiple generations of snapshot volumes in a remote site without synchronizing the remote master volume with the master volume.

In order to achieve the object, an exemplary embodiment of the present invention is a disk apparatus, which includes a second volume to which data of a first volume is copied; a third volume which stores a snapshot of said first volume, and copy of difference data between data of said first volume after finishing writing of data to said first volume and original data of said first volume; and an I/O processing unit which reads out data from said third volume when data of an address in which said difference data exists in said third volume is read out by a host, and when data of an address in which said difference data does not exist in said third volume is read out by said host, reads out data from said first volume if data copying from said first volume to said second volume has not been completed, and reads out data from said second volume if the data copying has been completed.

Further, according to the present invention, a non-transitory computer-readable recording medium for storing a computer program of data replication onto a disk apparatus is provided. The non-transitory computer-readable recording medium having embodied thereon a computer program of data replication onto a disk apparatus, which when executed by a computer, causes the computer to execute steps of: an I/O processing step for storing a snapshot of a first volume, and reading out data from a third volume, which stores a copy of difference data between data of said first volume after finishing writing of data to said first volume and original data of said first volume, when data of an address in which said difference data exists in said third volume is read out by a host; reading out data from said first volume when data of an address in which said difference data does not exist in said third volume is read out by said host, if data copying from said first volume to said second volume has not been completed; and reading out data from said second volume, if the data copying which copies data of said first volume to said second volume has been completed.

Further, according to the present invention, a data replicating method is provided, and the data replicating method includes, storing a snapshot of a first volume, and reading out data from a third volume, which stores a copy of difference data between data of said first volume after finishing writing of data to said first volume and original data of said first volume, when data of an address in which said difference data exists in said third volume is read out by a host; reading out data from said first volume when data of an address in which said difference data does not exist in said third volume is read out by said host, if data copying from said first volume to said second volume has not been completed; and reading out data from said second volume, if the data copying which copies data of said first volume to said second volume has been completed.

BRIEF DESCRIPTION OF THE DRAWINGS

Exemplary features and advantages of the present invention will become apparent from the following detailed description when taken with the accompanying drawings in which:

FIG. 2 is a figure for describing the first exemplary embodiment of the present invention;

FIG. 3 is a figure showing an example of difference management table 1162;

FIG. 4 is a figure showing an example of copy table 1163;

FIG. 5 is a figure showing an example of purge page table 1164;

FIG. 6 is a figure showing an example of reference table 2172.

EXEMPLARY EMBODIMENT

Figure 1:
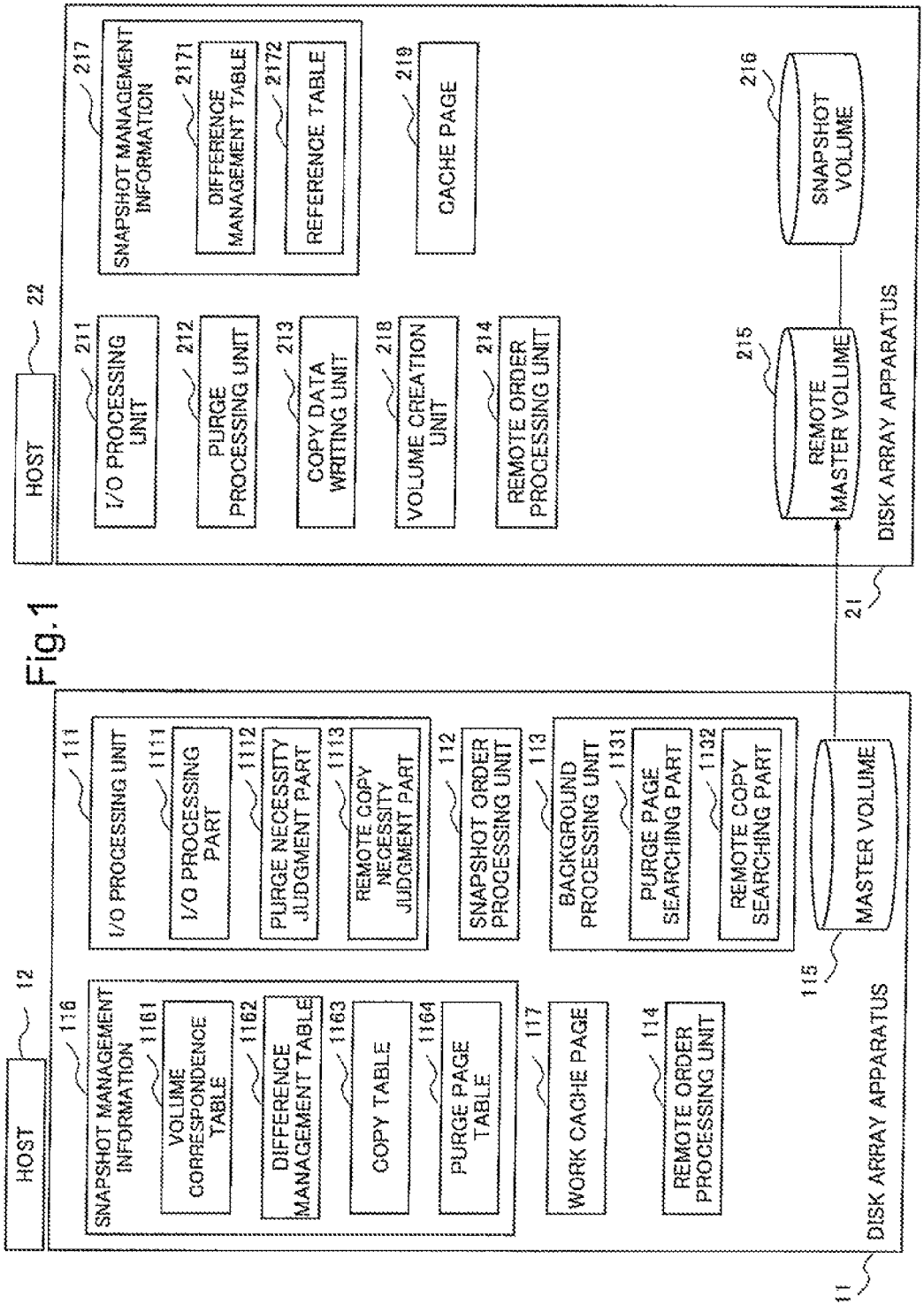
FIG. 1 is a figure for describing the first exemplary embodiment of the present invention.

Hereinafter, the exemplary embodiment of the present invention will be described by using drawings. In all drawings, the same reference code is given to the same component, and the description is omitted appropriately.

Further, each unit, which configures a disk apparatus or the like of each embodiment, includes a control unit, a memory, programs having been loaded on the memory, a storage unit such as a hard disk or the like for storing programs and interfaces for network connections, and is realized by arbitrary combination of hardware and software. And, the realization method and apparatus are not limited unless otherwise noted.

Further, the control unit includes CPU (Central Processing Unit) or the like, and as well as controlling the whole apparatus such as the disk apparatus by operating the operating system, reads out the program and data from a recording medium loaded on a drive apparatus, for example, to the memory, and various processing is executed according to this.

The recording media are, for example, an optical disc, a flexible disc, a magnetic optical disc, an external hard disk and a semiconductor memory or the like, and record a computer program so that it can be read by a computer. The computer program may be downloaded from an outside computer not shown connected to communication networks. Here, the communication networks may be the Internet, a LAN (Local Area Network), a public circuit network, a wireless communication network or a network or the like which is configured by combining these unless otherwise noted.

Further, the block diagram used in the description of each exemplary embodiment indicates the configuration of the function unit, not the configuration of the hardware unit. These function blocks are realized by arbitrary combination of hardware and software. In these figures, it may be described so that a component part of each exemplary embodiment may be realized by one apparatus which is physically combined, however, the realization means is not limited to this. That is, it may connect more than two apparatuses, which are physically separated, by a wire or wireless, and may realize each component part, an apparatus and a system of each exemplary embodiment by these plural numbers of apparatus. Also, each component part may be described as more than two apparatuses which are physically separated, however, the realization means is not limited to this. That is, it may combine hardware and software arbitrary so that those may be realized by one apparatus which is physically combined, and may realize each component part, an apparatus and a system of each exemplary embodiment. Further, the disk apparatus may be a disk array apparatus besides a general disk apparatus.

<Exemplary Embodiment 1>

First, the outline of the first exemplary embodiment of the present invention will be described.

The first exemplary embodiment of the present invention relates to the technology which creates multiple generations of snapshots of the disk array apparatus 11 of a local site in the disk array apparatus 21 of a remote site for a volume in a data copy method between two disk array apparatuses 11, 21. Specifically, in FIG. 1, the snapshot volume 216 that stores difference data for the master volume 115 is provided to the disk array apparatus 21 of the remote site. A remote copy searching part 1132 performs a remote copy with asynchronous so that the remote master volume 215 may become data images of the master volume 115 at the time of creating the snapshot volume 216. When a host 22 reads the snapshot volume 216, an I/O processing unit 211 distinguishes the volume of read destination with reference to a difference management table 2171 and a reference table 2172, and reads data from the snapshot volume 216, the remote master volume 215 or the master volume 115. The read destination is different depending on a case whether the remote copy to the remote master volume 215 is completed or not. Specifically, when the remote copy is completed, the host 22 refers to the data of the remote master volume 215, and when the remote copy is not completed, it refers to the data of the master volume 115. As a result, it becomes possible to create multiple generations of the snapshot volumes 216 in the remote site without synchronizing the remote master volume 215 with the master volume 115, and also, without deteriorating the write performance to the master volume 115.

Next, the configuration of the first exemplary embodiment of the present invention will be described.

FIG. 1 is a figure showing a configuration diagram in this exemplary embodiment. Referring to FIG. 1, the disk array apparatuses 11, 21 which perform copy process of the present invention are remotely provided in the local site and the remote site, and are connected with the hosts 12, 22 respectively. It may be possible to configure so that the disk array apparatuses 11, 21 may be mutually connected by communication lines and may be able to perform the remote data copy without passing through the hosts 12, 22.

First, the configuration of the disk array apparatus 11 will be described.

The disk array apparatus 11 includes an I/O processing unit 111, a snapshot order processing unit 112, a background processing unit 113, a remote order processing unit 114, the master volume 115, snapshot management information 116 and work cache page 117.

The I/O processing unit 111 includes an I/O processing part 1111, a purge necessity judgment part 1112 and a remote copy necessity judgment part 1113.

The I/O processing part 1111 receives write data and a write order from the host 12 and refers to a volume correspondence table 1161, and examines whether the master volume 115 of a write target is during operation of snapshot copying to the remote site. And, when the master volume 115 of the write target is not during operation of snapshot copying to the remote site, the I/O processing part 1111 writes the write data into the master volume 115. On the other hand, the I/O processing part 1111 copies the write data to the work cache page 117 when the master volume 115 of the write target is during operation of snapshot copying to the remote site. If the writing process is completed, the I/O processing part 1111 returns a response to the host 12.

The purge necessity judgment part 1112 examines whether difference data exists in the snapshot volume 216 of the remote site with reference to a difference management table 1162 for the write data which the I/O processing part 1111 has received. The difference data is the data which is only a difference occurred in the master volume 115 after completion of the initial copy operation which has copied data of the master volume 115 to the remote master volume 215 and the snapshot volume 216. And, when the difference data does not exist in the snapshot volume 216 of the remote site (a flag on the difference management table 1162 is set to 0, refer to FIG. 3), the purge necessity judgment part 1112 determines that it needs purge copy, and sets a purge page table 1164 to a state of purge effective (it sets a flag on the purge page table 1164 to 1). On the other hand, when the difference data exists in the snapshot volume 216 of the remote site (a flag on the difference management table 1162 is set to 1, refer to FIG. 3), the purge necessity judgment part 1112 determines that the purge copy is unnecessary and writes the write data into the master volume 115.

The remote copy necessity judgment part 1113 examines a copy table 1163 when the purge necessity judgment part 1112 has determined necessity of the purge copy (a flag on the difference management table 1162 is set to 0, refer to FIG. 3). The remote copy necessity judgment part 1113 determines that the remote copy is unnecessary when the copy table 1163 indicates a state of copy no need (when a flag on the copy table 1163 is set to 0). On the other hand, when the copy table 1163 indicates a state of copy need (when a flag on the copy table 1163 is set to 1), the remote copy necessity judgment part 1113 determines that the remote copy is necessary, and notifies the remote order processing unit 114 of a remote copy order. Further, here, the case where the remote copy is necessary is the case where there is a write order from the host 12, at the time when the snapshot volume 216 is newly created, to the address in which respective data of the master volume 115 and the remote master volume 215 does not coincide with each other. Therefore, there are more cases that the remote copy necessity judgment part 1113 determines that the remote copy is unnecessary than determining the remote copy is necessary.

The snapshot order processing unit 112 receives a remote snapshot creation order and a remote master volume creation order from the host 12. When the remote snapshot creation order is received, the snapshot order processing unit 112 notifies the remote order processing unit 114 of the order. The remote order processing unit 114 notifies the disk array apparatus 21 of the order, and receives a response of creation completion of the snapshot volume 216 of the remote site from the disk array apparatus 21. When the remote order processing unit 114 receives the response, the snapshot order processing unit 112 adds the snapshot volume 216 newly created in the volume correspondence table 1161. When the remote master volume creation order is received, the snapshot order processing unit 112 notifies the remote order processing unit 114 of the order. The remote order processing unit 114 notifies the disk array apparatus 21 of the order and receives a response of creation completion of the remote master volume 215 from the disk array apparatus 21. When the remote order processing unit 114 receives the response, the snapshot order processing unit 112 adds the remote master volume 215 newly created in the volume correspondence table 1161.

The background processing unit 113 includes a purge page searching part 1131 and a remote copy searching part 1132.

The purge page searching part 1131 periodically searches from the purge page table 1164 of the master volume 115 for a page of purge effective (a flag on the purge page table 1164 is set to 1), and notifies the remote order processing unit 114 of a purge copy order when it has found the page of purge effective. The purge page searching part 1131 sets a state of difference data existing (it sets a flag to 1) in the difference management table 1162 when the remote order processing unit 114 has received a response of purge copy completion from the disk array apparatus 21, further, it releases a state of purge effective (a flag is set to 0) in the purge page table 1164.

The remote copy searching part 1132 periodically searches for a page that needs copying from the copy table 1163 of the master volume 115. If the page that needs copying is found from the copy table 1163, the remote copy searching part 1132 examines the difference management table 1162 of the snapshot volume 216 which is during operation of snapshot copying. When there is no state of difference data existing in the difference management table 1162, in other words, only the case where the difference data does not exist in the snapshot volume 216, the remote copy searching part 1132 determines that it needs the remote copy, reads out data of the master volume 115 to the work cache page 117 and notifies the remote order processing unit 114. The remote copy searching part 1132 sets a state of copy no need in the copy table 1163 when the remote order processing unit 114 has received a response of remote copy completion from the disk array apparatus 21.

The remote order processing unit 114 transmits the remote snapshot creation order, the remote master volume creation order, the remote copy order and the purge copy order mentioned above to the disk array apparatus 21 of the remote site, and receives the response from the disk array apparatus 21. Also, the remote order processing unit 114 receives a master volume read order from the disk array apparatus 21, and reads out the data of the master volume 115 to the work cache page 117, and transmits to the disk array apparatus 21.

The master volume 115 is a disk which is accessed from the host 12, and is a logical volume having redundant configuration by combining a plurality of physical disks.

The snapshot management information 116 includes the volume corresponding table 1161, the difference management table 1162, the copy table 1163 and the purge page table 1164.

The volume correspondence table 1161 is a table which manages a corresponding relationship among the master volume 115 which is during operation of remote snapshot copying, the remote master volume 215 and the snapshot volume 216. In the snapshot management information 116, the volume numbers of the remote master volume 215 and the snapshot volume 216 (remote master volume numbers RMV0-RMVn and the latest generation snapshot volume numbers SV0-SVn) corresponding to the volume numbers of the master volume 115 (master volume numbers MV0-MVn) are indicated. An example of the volume correspondence table 1161 is shown in FIG. 2.

The difference management table 1162 manages whether the difference data exists in the snapshot volume 216 by a flag (0, 1) for each page as a unit. It is supposed that there is the difference data (a state of difference data existing) when a flag rises (1), and when a flag does not rise (0), there is no difference data (a state of no difference data) in the difference management table 1162. FIG. 3 shows an example of the difference management table 1162.

The copy table 1163 manages necessity of copying from the master volume 115 to the remote master volume 215 by a flag (0, 1) for each page as a unit. It is supposed that copying is needed (a state of copy need) when a flag rises (1), and when a flag does not rise (0), copying is not needed (a state of copy no need) in the copy table 1163. FIG. 4 shows an example of the copy table 1163.

The purge page table 1164 manages necessity of the purge copy for pre-update data of the master volume 115 to the snapshot volume 216 by a flag (0, 1). It is supposed that the purge copy is needed (a state of purge effective) when a flag rises (1), and when a flag does not rise (0), the purge copy is not needed (a state of purge ineffective) in the purge page table 1164. FIG. 5 shows an example of the purge page table 1164.

The work cache page 117 is a memory which stores write data temporarily and also temporarily stores data of the master volume 115 which has been read out for transmitting to the disk array apparatus 21 of the remote site.

Next, the configuration of the disk array apparatus 21 will be described.

The disk array apparatus 21 includes an I/O processing unit 211, a purge processing unit 212, a copy data writing unit 213, a remote order processing unit 214, a remote master volume 215, a snapshot volume 216, snapshot management information 217 and a volume creation unit 218.

The I/O processing unit 211 receives a read order from the host 22, examines a difference management table 2171 and a reference table 2172 and determines a read destination of the read data, and when the read destination is the snapshot volume 216 or the remote master volume 215, reads out data from the volume to the cache page 219. When the read destination is the master volume 115, the I/O processing unit 211 notifies the remote order processing unit 214 of the read order, reads out data from the master volume 115 to the cache page 219 and returns the data having read out to the host 22.

When the remote order processing unit 214 has received the purge copy order from the remote order processing unit 114, the purge processing unit 212 writes the data of the remote master volume 215 into the snapshot volume 216 for a specified page by the order, and sets a difference management table 2171 to a state of difference data existing.

When the remote order processing unit 214 has received the remote copy order from the remote order processing unit 114, the copy data writing unit 213 writes the received data of the master volume 115 into the remote master volume 215, and resets a flag on a reference table 2172 (it sets to 0).

The remote order processing unit 214 receives remote orders from the disk array apparatus 11 of the local site, activates processing according to the order, and returns the response. The remote order processing unit 214 respectively starts the copy data writing unit 213 when having received the remote copy order from the remote order processing unit 114, starts the purge processing unit 212 when having received the purge copy order, and starts the volume creation unit 218 when having received the remote snapshot creation order.

Also, the remote order processing unit 214 transmits a master volume read order to the disk array apparatus 11 when having received a reading request of the master volume 115 from the I/O processing unit 211, receives data of the master volume 115 from the disk array apparatus 11, and writes onto the cache page 219.

The remote master volume 215 is a logical volume of the same size as the master volume 115, and the data of the master volume 115 is copied so that it may become the data image of the master volume 115 at the time of creating the snapshot volume 216.

The snapshot volume 216 is a volume of the same size as the master volume 115, and a volume creation unit 218 creates by receiving the snapshot creation order. The snapshot volume 216 stores difference data of the master volume 115 between before and after the snapshot volume 216 having been created.

The snapshot management information 217 includes the difference management table 2171 and the reference table 2172.

The difference management table 2171 is the same one as the difference management table 1162 of the disk array apparatus 11.

When the address in which the difference data does not exist in the snapshot volume 216 is referred, the reference table 2172 manages whether the remote master volume 215 is to be referred to or the master volume 115 is to be referred to by a flag (0, 1) for each page as a unit. It is supposed that the master volume 115 is referred to when a flag rises (1), and when a flag does not rise (0), the remote master volume 215 is referred to in the reference table 2172. FIG. 6 shows an example of the reference table 2172.

When the remote order processing unit 214 has received the remote snapshot creation order from the remote order processing unit 114, the volume creation unit 218 creates the snapshot volume 216 newly and copies the copy table 1163 of the master volume 115 included in the remote snapshot creation order to the reference table 2172. Also, the volume creation unit 218 creates the remote master volume 215 when having received the remote master volume creation order from the remote order processing unit 114.

The cache page 219 is a memory which stores the read data by the I/O processing unit 211 which has read out the read data corresponding to the read order received from the host 22, and also, is a memory which stores the data of the master volume 115 temporarily when the remote order processing unit 214 receives the remote copy order.

Next, operation of this exemplary embodiment will be described.

In order to realize the snapshot copy of the present invention, the remote master volume 215 and the snapshot volume 216 need to be created.

Figure 7:
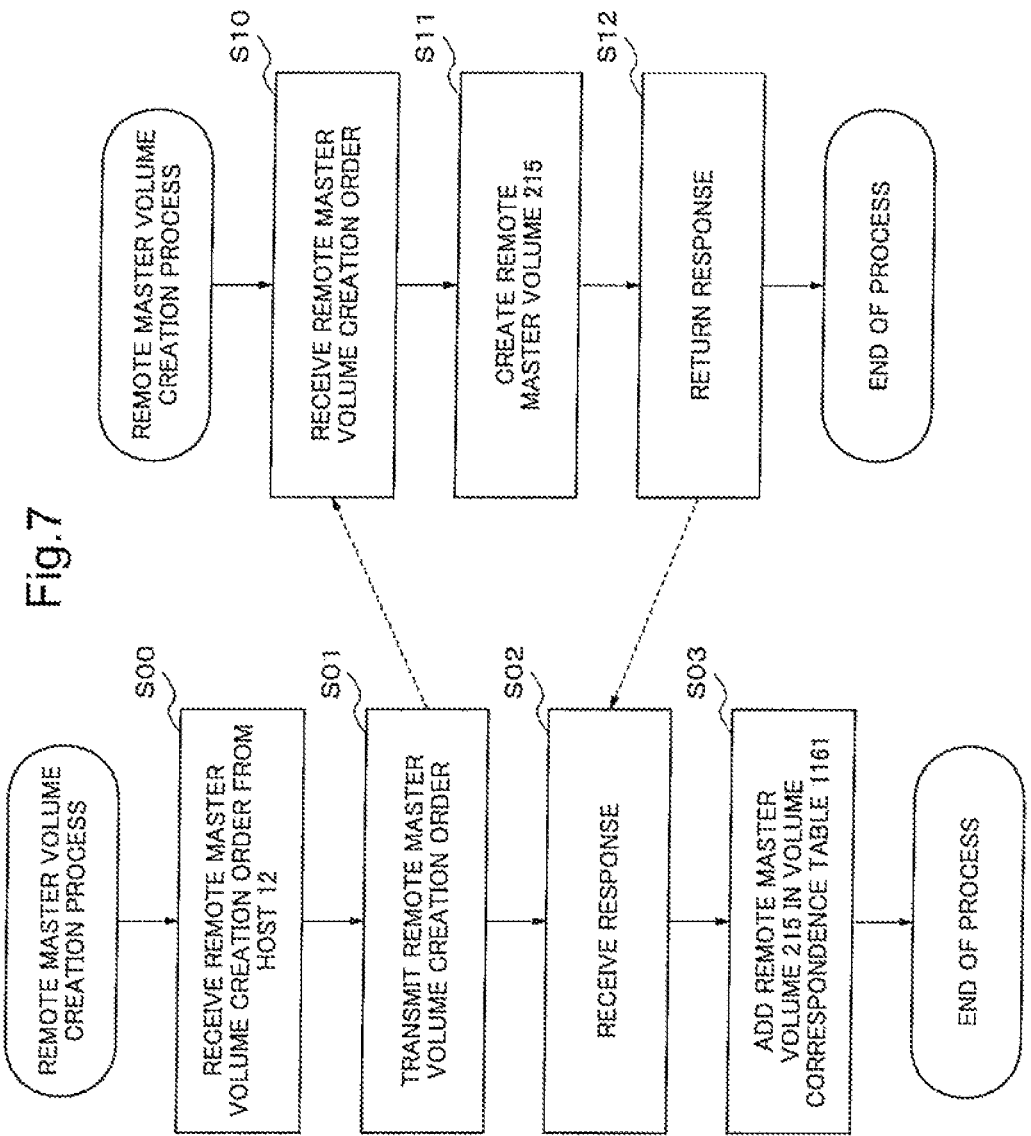
FIG. 7 is a figure for describing operation when creating remote master 215.

Accordingly, first, operation when creating the remote master volume 215 in the remote site will be described with reference to FIG. 7.

When the snapshot order processing unit 112 of the disk array apparatus 11 receives a remote master volume creation order from the host 12, the remote order processing unit 114 creates the remote master volume creation order and transmits that to the disk array apparatus 21 of the remote site (S00-S01).

When the remote order processing unit 214 of the remote site receives the remote master volume creation order, the volume creation unit 218 creates the remote master volume 215 in the disk array apparatus 21 and returns a response to the disk array apparatus 11 (S10-S12).

When the remote order processing unit 114 of the local site receives the response, the snapshot order processing unit 112 adds the created remote master volume 215 in the volume correspondence table 1161 (S02-S03).

Figure 8:
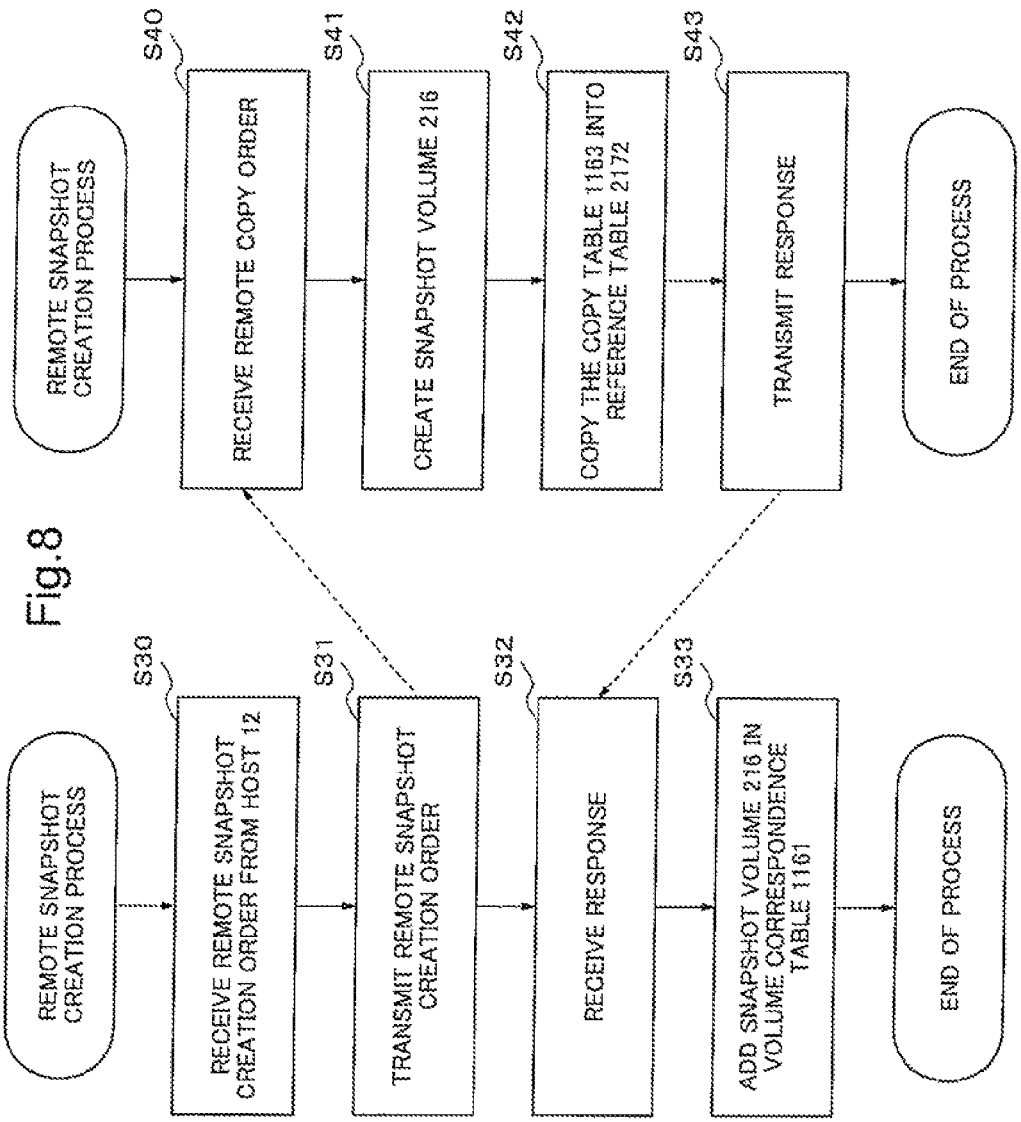
FIG. 8 is a figure for describing operation when creating the snapshot volume 216.

Next, operation when creating the snapshot volume 216 in the remote site will be described with reference to FIG. 8.

When the snapshot order processing unit 112 of the disk array apparatus 11 receives a remote snapshot creation order from the host 12 (S30), the remote order processing unit 114 creates the remote snapshot creation order and transmits to the disk array apparatus 21 of the remote site (S31). The copy table 1163 of the master volume 115 at the time when the snapshot order processing unit 112 received the remote snapshot creation order is included in the remote snapshot creation order.

When the remote order processing unit 214 of the remote site receives the remote snapshot creation order from the remote order processing unit 114 (S40), the volume creation unit 218 creates the new snapshot volume 216 in the disk array apparatus 21 (S41). The volume creation unit 218 copies the copy table 1163 which is included in the received remote snapshot creation order to the reference table 2172 of the snapshot volume 216 (S42). When copying to the reference table 2172 is completed, the remote order processing unit 214 returns a response to the disk array apparatus 11 of the local site (S43).

When the remote order processing unit 114 of the local site receives the response to the remote snapshot creation order (S32), the snapshot order processing unit 112 adds the newly created snapshot volume 216 in the volume correspondence table 1161 (S33).

Figure 9:
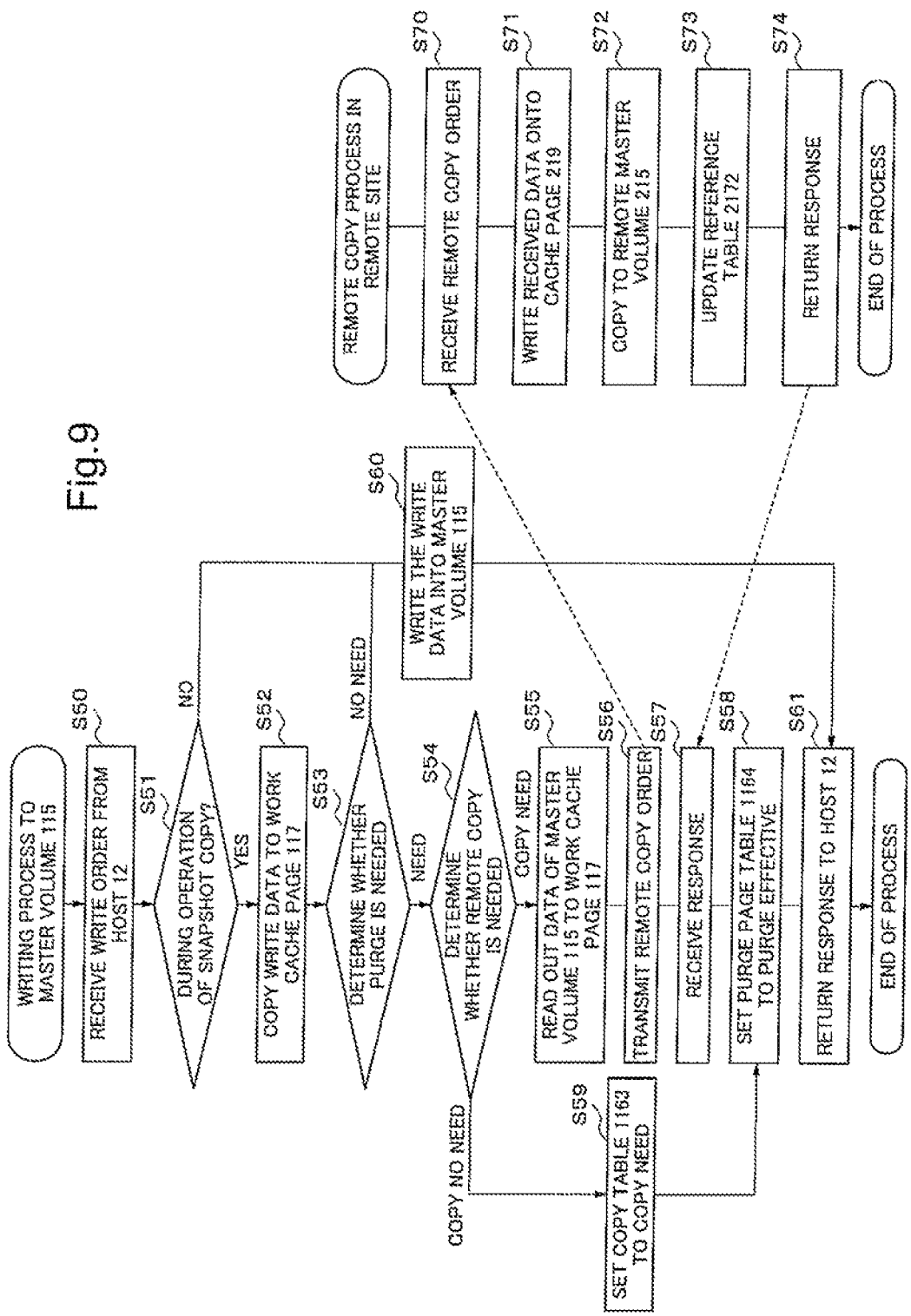
FIG. 9 is a figure for describing operation of writing process to master volume 115.

Next, operation of writing process to the master volume 115 will be described with reference to FIG. 9.

When a write order from the host 12 is received (S50), the I/O processing part 1111 of the disk array apparatus 11 determines whether the master volume 115 of a write target is during operation of snapshot copying in the remote site with reference to the volume correspondence table 1161 (S51). When the master volume 115 of the write target is not during operation of snapshot copying in the remote site (S51, no), the I/O processing part 1111 writes the write data into the master volume 115 and returns a response to the host 12 (S60, S61). On the other hand, when the master volume 115 of the write target is during operation of snapshot copying in the remote site, the I/O processing part 1111 copies the write data to the work cache page 117 (S51, yes) (S52). And then, the purge necessity judgment part 1112 examines whether the difference data exists in the snapshot volume 216 which is during operation of snapshot copying with reference to the difference management table 1162, judges that it is a state of purge copy no need when the difference data exists in the snapshot volume 216 (in case a flag on the difference management table 1162 is set to 1), and judges that it is a state of purge copy need when the difference data does not exist (in case a flag on the difference management table 1162 is set to 0) (S53).

The purge necessity judgment part 1112 writes the write data of the work cache page 117 into the master volume 115 when judging that it is a state of purge copy no need (S53, no need) (S60). When the writing to the master volume 115 is completed, the I/O processing part 1111 returns a response to the host 12 (S61).

On the other hand, when the purge necessity judgment part 1112 has judged that it is a state of purge copy need (S53, need), the remote copy necessity judgment part 1113 refers to the copy table 1163. The remote copy necessity judgment part 1113 determines that the remote copy from the master volume 115 to the remote master volume 215 is needed before performing the purge copy in a case where the copy table 1163 shows a state of copy need (a flag is 1), and determines that the copying is unnecessary in a case where the copy table 1163 shows a state of copy no need (a flag is 0) (S54). Further, there are more cases that the remote copy necessity judgment part 1113 determines that the remote copy is unnecessary than determining the remote copy is necessary, because the case where the remote copy is necessary here is, as mentioned above, only a case (the first time only) where the write order has come from the host 12 to the address in which respective data of the remote master volume 215 and the master volume 115 does not coincide with each other yet at the time when the snapshot volume 216 is newly created.

The remote copy necessity judgment part 1113 reads out the data of the master volume 115 to the work cache page 117 when the purge necessity judgment part 1112 has determined that it needed the remote copy (S55). When the data reading out from the master volume 115 is completed, the remote order processing unit 114 creates the remote copy order for copying the data of the master volume 115, which has been read out to the work cache page 117, to the remote master volume 215 of the remote site and transmits to the disk array apparatus 21 of the remote site (S56).

When the remote copy order is received (S70), the remote order processing unit 214 of the disk array apparatus 21 of the remote site writes the received data of the master volume 115 onto the cache page 219 (S71). And then, the copy data writing unit 213 copies the data of the master volume 115 in the cache page 219 to the remote master volume 215 (S72). Next, the copy data writing unit 213 updates a flag on the reference table 2172 by resetting (set to 0), and makes a state of reference to the remote master volume 215 (S73).

When the updating in the reference table 2172 is completed, the remote order processing unit 214 of the remote site returns a response to the disk array apparatus 11 of the local site (S74).

The process from remote copy order reception to response return (process of steps from S70 to S74 of FIG. 9) is called "remote copy process of a remote site". When the remote order processing unit 114 of the local site receives the response to the remote copy order (S57), the purge necessity judgment part 1112 sets the purge page table 1164 to a state of purge effective (set a flag to 1) (S58). When the setting to a state of purge effective is completed, the I/O processing part 1111 returns a response to the host 12 (S61).

When judging that the remote copy is unnecessary, the remote copy necessity judgment part 1113 sets the copy table 1163 to a state of copy need (set a flag to 1) (S59). When the copy table 1163 is set, the purge necessity judgment part 1112 sets the purge page table 1164 to a state of purge effective (set a flag to 1) (S58). When the setting to a state of purge effective is completed, the I/O processing part 1111 returns a response to the host 12 (S61).

Figure 10:
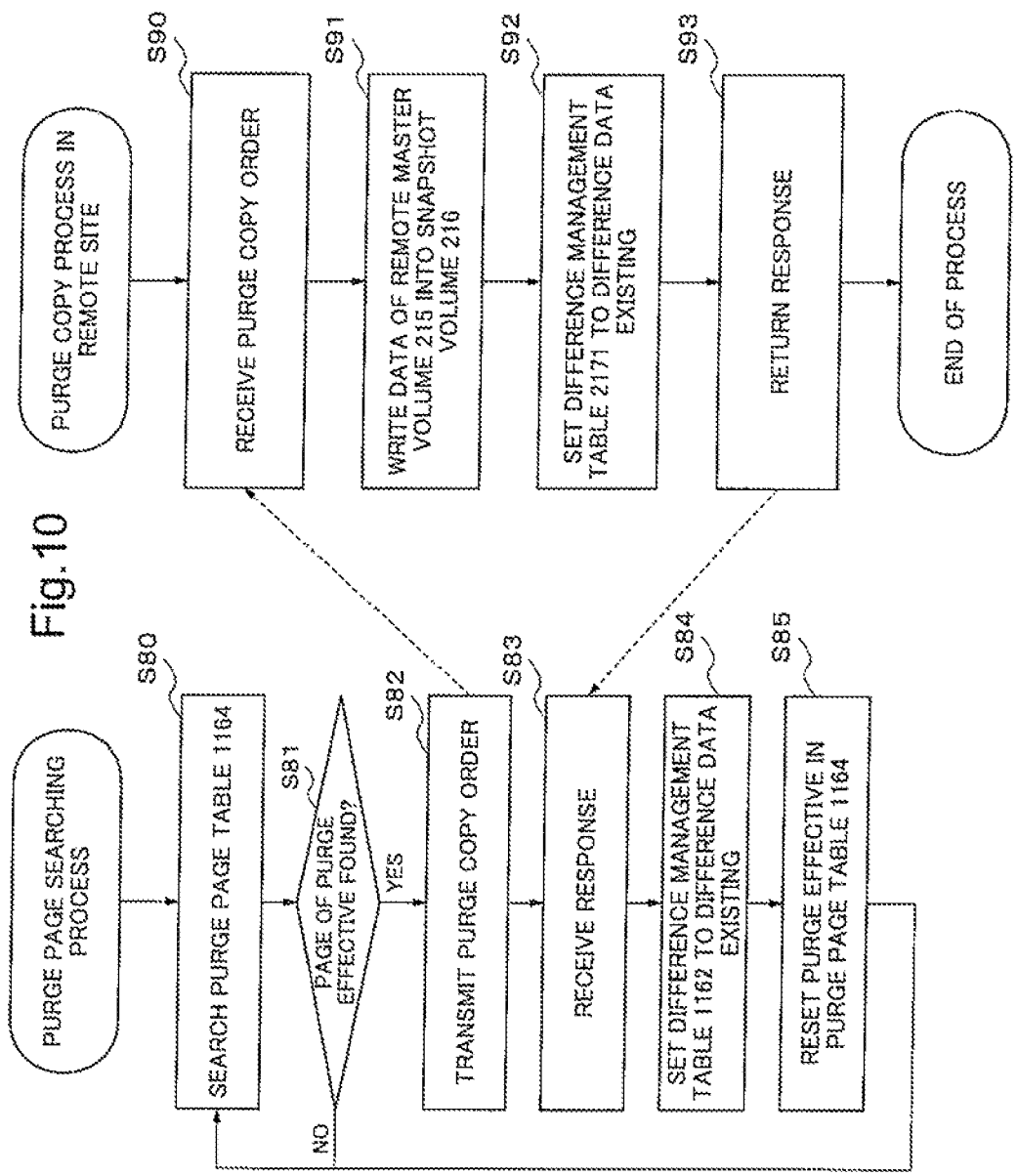
FIG. 10 is a figure for describing purge page searching process.
Figure 11:
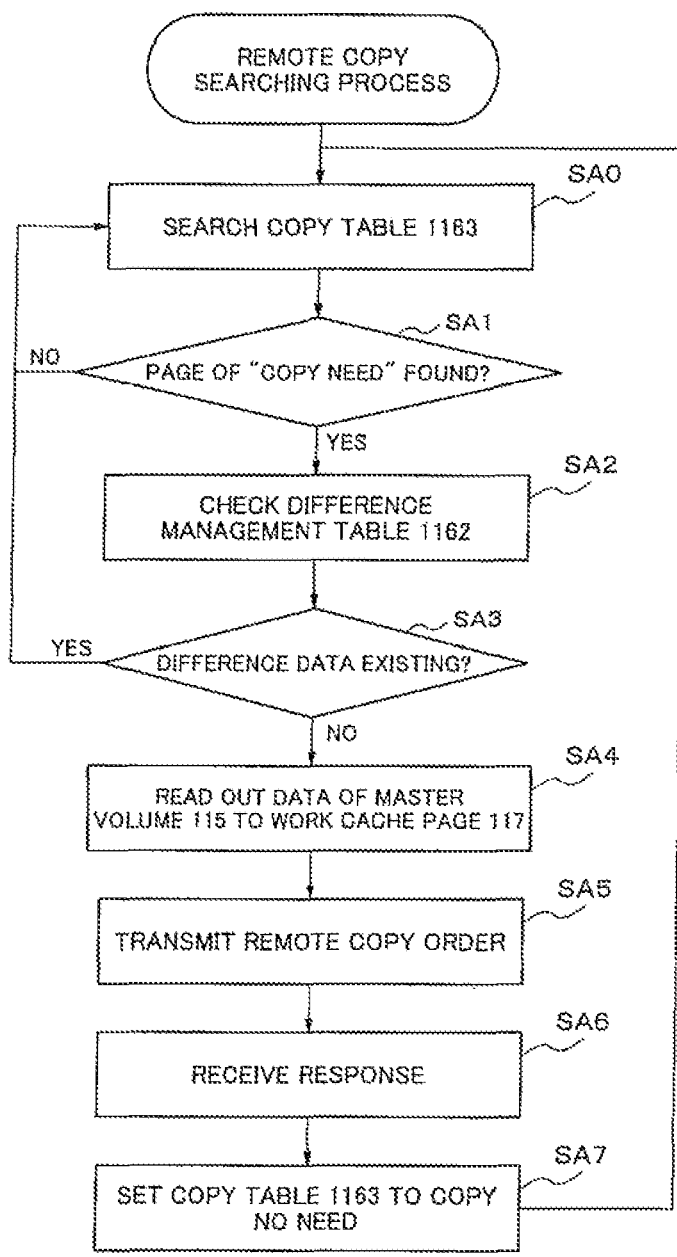
FIG. 11 is a figure for describing remote copy searching process.

Next, background operation will be described with reference to FIG. 10 and FIG. 11.

First, the purge page searching process will be described using FIG. 10. The purge page searching part 1131 periodically searches the purge page table 1164 for a page having a state of purge effective (a flag is 1) (S80).

When the purge page searching part 1131 has found the page having a state of purge effective (S81, yes), the remote order processing unit 114 transmits the purge copy order of the page having a state of purge effective to the disk array apparatus 21 of the remote site (S82).

When the remote order processing unit 214 of the disk array apparatus 21 of the remote site receives the purge copy order (S90), the purge processing unit 212 writes the data of the page of the remote master volume 215 indicated by the purge copy order into the snapshot volume 216 (S91).

When writing to the snapshot volume 216 is completed, the purge processing unit 212 sets the difference management table 2171 of the purge copy page to a state of difference data existing (set a flag to 1) (S92).

When setting in the difference management table 2171 is completed, the remote order processing unit 214 returns a response to the disk array apparatus 11 of the local site (S93).

When the remote order processing unit 114 of the local site receives the response to the purge copy order (S83), the purge page searching part 1131 sets the difference management table 1162 of the purge copy page to a state of difference data existing (set a flag to 1) (S84), and the purge page searching part 1131 releases the setting of a state of purge effective in the purge page table 1164 (set a flag to 0) (S85).

Next, remote copy searching process will be described using FIG. 11.

The remote copy searching part 1132 periodically searches for a page having a state of copy need (a flag is set to 1) on the copy table 1163 (SA0). When the remote copy searching part 1132 has found the page having a state of copy need (SA1, yes), the remote copy searching part 1132 examines the difference management table 1162 (SA2). Because the purge copy from the remote master volume 215 to the snapshot volume 216 has already been completed when the difference management table 1162 indicates a state of difference data existing, the remote copy searching part 1132 determines that the remote copy from the master volume 115 to the remote master volume 215 is unnecessary (SA3, yes). On the other hand, when the difference management table 1162 indicates a state of no difference data, the remote copy searching part 1132 judges that it needs the remote copy from the master volume 115 to the remote master volume 215 and reads out data of the master volume 115 to the work cache page 117 (SA4).

When the data reading out of the master volume 115 is completed, the remote order processing unit 114 creates the remote copy order for copying data of the master volume 115 of the work cache page 117 to the remote master volume 215 of the remote site, and transmits to the disk array apparatus 21 of the remote site (SA5).

When the remote copy order is received, the remote order processing unit 214 of the remote site executes the above-mentioned "remote copy process (FIG. 9, S70-S74) of a remote site", and returns a response. When the remote command transmitting part 114 of the local site receives the response to the remote copy order, the remote copy searching part 1132 resets a flag on the copy table 1163 (set a flag to 0) and sets to a state of copy no need (SA7).

Figure 12:
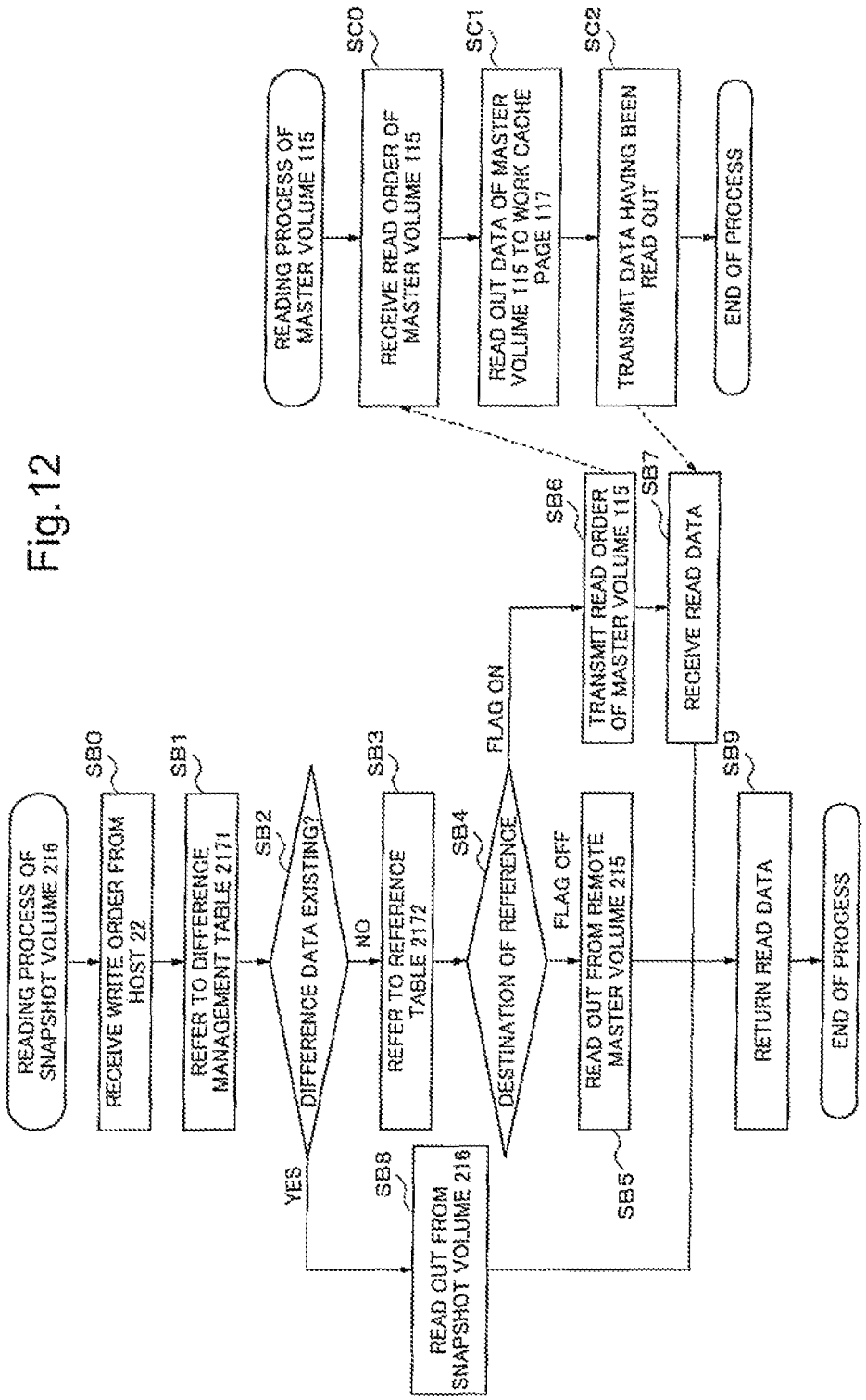
FIG. 12 is a figure for describing reading operation to snapshot volume 216.
Figure 13:
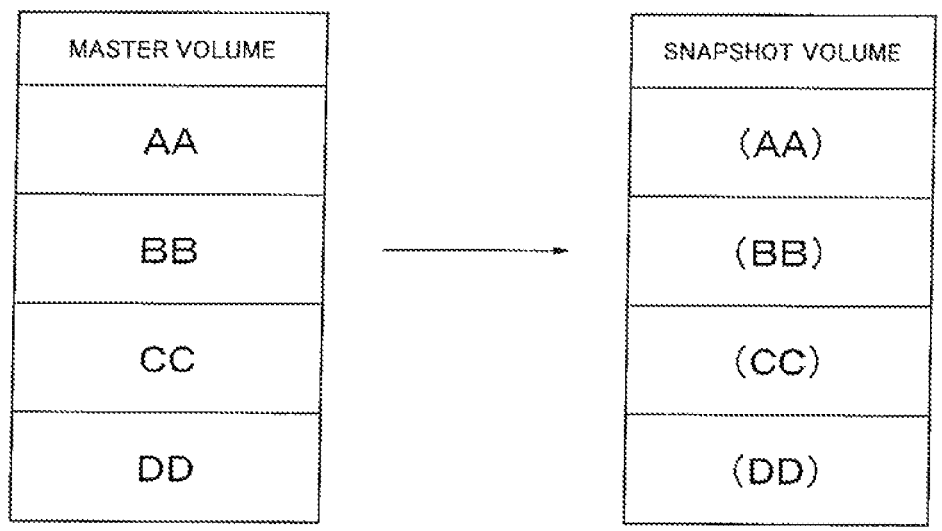
FIG. 13 is a figure for describing a snapshot method.
Figure 14:
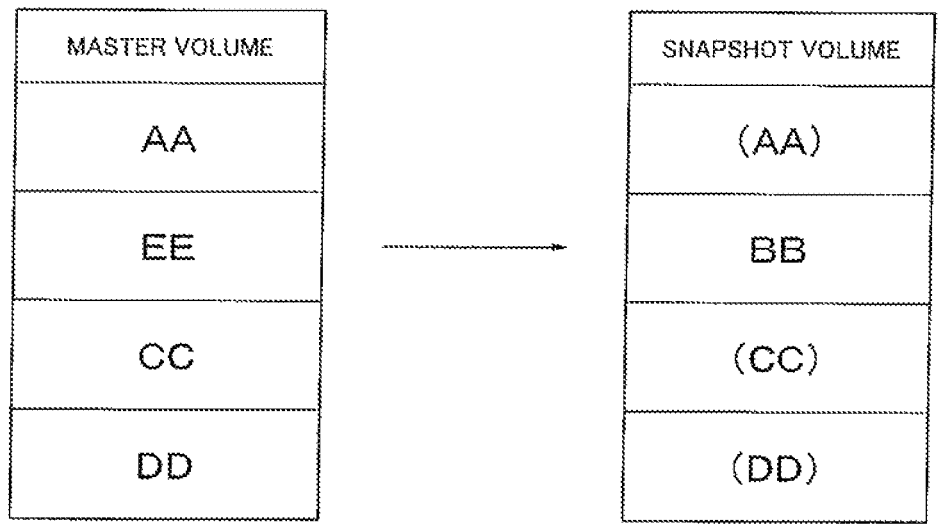
FIG. 14 is a figure for describing a snapshot method.
Figure 15:
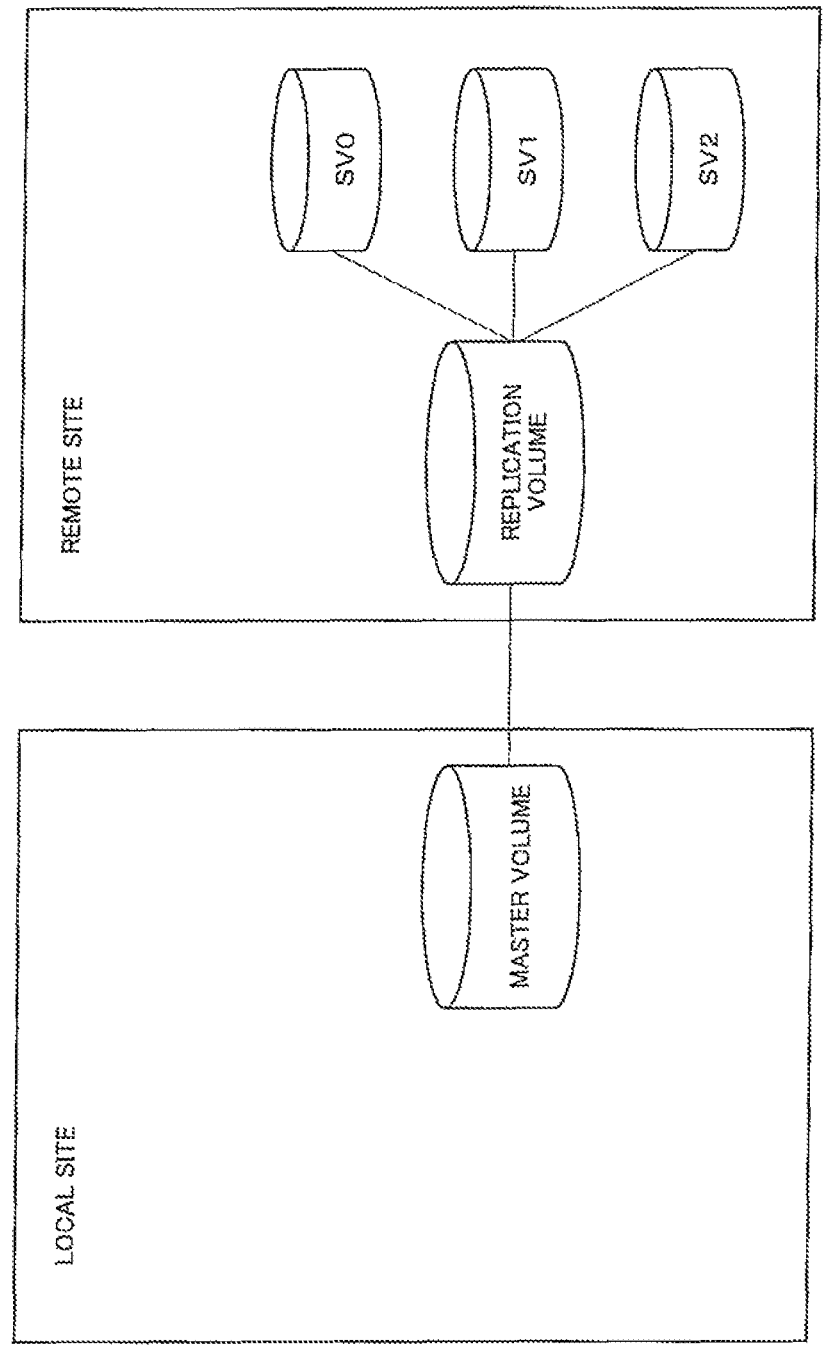
FIG. 15 is a figure for describing a prior art example.

Next, reading operation to the snapshot volume 216 will be described with reference to FIG. 12.

When a read order is received from the host 22 (SB0), the I/O processing unit 211 of the disk array apparatus 21 determines a read destination of data for the reading range. First, the I/O processing unit 211 refers to the difference management table 2171 (SB1), and in case of a state of difference data existing, it judges the snapshot volume 216 as the read destination (SB2 and yes). On the other hand, in case of a state of no difference data, the I/O processing unit 211 refers to the reference table 2172 (SB3), and determines whether the flag is set to on (1) or off (0) (SB4). When the flag of the reference table 2172 is set to on (1), the I/O processing unit 211 determines the remote master volume 215 as the read destination, and when the flag of the reference table 2172 is set to off (0), the I/O processing unit 211 determines the master volume 115 as the read destination. When having determined the read destination, the I/O processing unit 211 reads out data from the volume of the determined read destination to the cache page 219 (SB5-SB7). Here, in a case where the read destination is the master volume 115 of the local site, the remote order processing unit 214 creates a read order to the master volume 115, and transmits to the disk array apparatus 11 of the local site (SB6). When the master volume read order is received (SC0), the remote order processing unit 114 of the local site reads out the data of the master volume 115 to the work cache page 117 (SC1), and transmits the read data to the disk array apparatus 21 of the remote site (SC2). The remote order processing unit 214 of the remote site writes the received data of the master volume 115 onto the cache page 219 (SB7). When the reading out of the read data is completed, the I/O processing unit 211 transmits the read data of the cache page 219 to the host 22 (SB9).

The first effect in this exemplary embodiment of the present invention is that when the snapshot volume 216 is created in the remote site, it is not necessary to copy all data of the master volume 115 of the local site to the remote site and to synchronize. The reason is because the data of the master volume 115 is referred to when data of the master volume 115 is not copied by the remote site at the time when the host 22 refers to an address in which the difference data does not exist in the snapshot volume 216.

The second effect is that the write performance to the master volume 115 does not decline even if it is during operation of snapshot copying in the remote site. The reason is because as well as performing copying from the master volume 115 to the remote site by the background operation, the purging process to the snapshot volume 216 due to the writing operation to the master volume 115 is performed by the background operation.

<Exemplary Embodiment 2>

Next, the second exemplary embodiment of the present invention will be described using FIG. 16.

Figure 16:
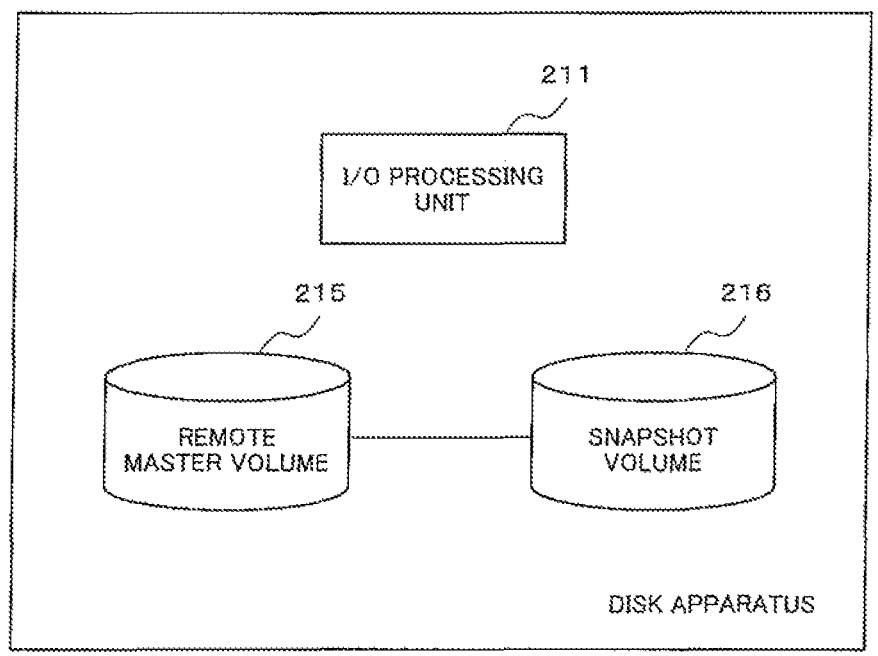
FIG. 16 is a figure for describing the second exemplary embodiment of the present invention.

According to this exemplary embodiment, as shown in FIG. 16, the disk apparatus includes the I/O processing unit 211, the remote master volume 215 and the snapshot volume 216. By this configuration, the disk apparatus, which includes a second volume to which data of a first volume is copied; a third volume which stores a snapshot of the first volume, and stores a copy of difference data between data of the first volume after writing of data has been applied to the first volume and original data of the first volume; and an I/O processing unit which reads out data from the third volume when data of an address in which the difference data exists in the third volume is read out by a host, and when data of an address in which the difference data does not exist in the third volume is read out by the host, reads out data from the first volume if data copying from the first volume to the second volume has not been completed, and reads out data from the second volume if the data copying has been completed, is provided.

According to this exemplary embodiment, a disk apparatus, a data replicating method onto the disk apparatus and a program, which can create multiple generations of snapshot volumes in a remote site without synchronizing the remote master volume 215 with the master volume 115, are provided. The reason is because the data of the master volume 115 is referred to when the data of the master volume 115 is not copied to the remote site at the time when the address in which the difference data does not exist in the snapshot volume 216 is referred from the host 22.

The present invention provides a disk apparatus, a data replicating method onto the disk apparatus and a program, which can create multiple generations of snapshot volumes in a remote site without synchronizing the remote master volume with the master volume.

While this invention has been particularly shown and described with reference to exemplary embodiments thereof, the invention is not limited to those specific embodiments. It will be understood by those of ordinary skill in the art that various changes in form and details may be made therein without departing from the spirit and scope of the present invention.

What is claimed is:

1. A disk apparatus comprising:
   a second volume to which data of a first volume is copied;
   a third volume which stores a snapshot of said first volume, and stores a copy of difference data between data of said first volume after finishing writing of data to said first volume and data of said first volume before writing of the data; and
   an I/O processing unit which reads out data from said third volume when data of an area in which said difference data exists in said third volume is read out by a host, and when data of an area in which said difference data does not exist in said third volume is read out by said host, reads out data from said first volume if data copying from said first volume to said second volume has not been completed, and reads out data from said second volume if the data copying has been completed.

2. The disk apparatus according to claim 1, further comprising:
   a copy data writing unit which creates a copy of data of said first volume in said second volume; and
   a purge processing unit which writes a copy of difference data between data of said first volume after finishing writing of data to said first volume and data of said first volume before writing of the data into said third volume.

3. The disk apparatus according to claim 2, further comprising:
   a purge page searching unit which periodically searches a purge page table for information indicating whether copying of said difference data from said first volume to said third volume is required or not, and
   wherein said purge processing unit writes the copy of the difference data when said purge page searching unit has found the difference data that need to be copied.

4. The disk apparatus according to claim 2, further comprising:
   a remote copy searching unit which periodically searches a copy table for information indicating copying of the data from said first volume to said second volume is required or not, and
   wherein said copy data writing unit copies said first volume to said second volume when said remote copy searching unit has found the data that need to be copied and in case where said difference data does not exist in said third volume.

5. A disk system comprising:
   a disk apparatus according to claim 1, and
   a computer which comprises said first volume, and is connected with said disk apparatus by a communication line.

6. A non-transitory computer-readable recording medium having embodied thereon a computer program of data replication onto a disk apparatus, which when executed by a computer, causes the computer to execute steps of: an I/O processing step for storing a snapshot of a first volume, and reading out data from a third volume, which stores a copy of difference data between data of said first volume after finishing writing of data to said first volume and data of said first volume before writing of the data, when data of an area in which said difference data exists in said third volume is read out by a host;
reading out data from said first volume when data of an area in which said difference data does not exist in said third volume is read out by said host, if data copying from said first volume to said second volume has not been completed; and
reading out data from said second volume, if the data copying which copies data of said first volume to said second volume has been completed.

7. The non-transitory computer-readable recording medium having embodied thereon a computer program of data replication onto a disk apparatus according to claim 6, causes the computer to further execute steps of:
   a copy data writing step for executing the data copying of said first volume to said second volume; and
   a purge processing step for writing a copy of difference data between data of said first volume after finishing writing of data to said first volume and data of said first volume before writing the data into said third volume.

8. The non-transitory computer-readable recording medium having embodied thereon a computer program of data replication onto a disk apparatus according to claim 7, causes the computer to further execute steps of:
   a purge page searching step for periodically searching a purge page table for information indicating whether copying of said difference data from said first volume to said third volume is required or not, and
   a purge processing step for writing the copy of the difference data when the difference data that need to be copied has been found in said purge page searching step.

9. The non-transitory computer-readable recording medium having embodied thereon a computer program of data replication onto a disk apparatus according to claim 7, causes the computer to further execute steps of:
   a remote copy searching step for periodically searching a copy table for information indicating copying of the data from said first volume to said second volume is required or not, and
   said copy data writing step for copying said first volume to said second volume when the data that need to be copied has been found in said remote copy searching step and in case where said difference data does not exist in said third volume.

10. A data replicating method comprising:
    storing a snapshot of a first volume, and reading out data from a third volume, which stores a copy of difference data between data of said first volume after finishing writing of data to said first volume and data of said first volume before writing the data, when data of an area in which said difference data exists in said third volume is read out by a host;
    reading out data from said first volume when data of an area in which said difference data does not exist in said third volume is read out by said host, if data copying from said first volume to said second volume has not been completed; and
    reading out data from said second volume, if the data copying which copies data of said first volume to said second volume has been completed.

* * * * *